United States Patent [19]
Hengen et al.

[11] 4,060,960
[45] Dec. 6, 1977

[54] SELF-PROPELLED CROP HARVESTER

[75] Inventors: Edward John Hengen, Bettendorf, Iowa; Mahlon Lloyd Love, Osco, Ill.

[73] Assignee: Deere & Company, Moline, Ill.

[21] Appl. No.: 679,344

[22] Filed: Apr. 22, 1976

[51] Int. Cl.² ............................................. A01D 45/02
[52] U.S. Cl. .................................. 56/14.6; 130/27 R; 130/27 T; 214/522
[58] Field of Search .................. 56/14.6, 14.5, 16.6, 56/473.5; 130/27 T, 27 R, 27 A, 27 HF, 27 H, 27 ST, 27 HA; 214/17 R, 522

[56] References Cited

U.S. PATENT DOCUMENTS

| | | | |
|---|---|---|---|
| 2,999,347 | 9/1961 | Horne et al. | 56/14.6 X |
| 3,152,702 | 10/1964 | Klemm et al. | 56/473.5 X |
| 3,439,683 | 4/1969 | Keller | 130/27 T |
| 3,476,270 | 11/1969 | Cox et al. | 214/17 R |
| 3,645,074 | 2/1972 | Rettig et al. | 56/14.6 |
| 3,650,052 | 3/1972 | Maiste et al. | 56/473.5 |

Primary Examiner—Jay N. Eskovitz

[57] ABSTRACT

A self-propelled crop harvester has opposite upright frame sides in truss form with horizontal frame members extending between them. A grain tank in saddle configuration straddles crop processing means and an engine, and sections of the walls of the saddle portions of the tank serve as the center bays of the truss frame sides. The saddle portions of the tank are also structurally connected at their lower extremities to the housing of a transverse auger conveyor which transfers grain from one saddle portion of the tank to the other. In addition to its conveyor function, the housing serves as a horizontal frame member. The transverse conveyor housing, and the front and rear axle assemblies which interconnect the frame sides at their forward and rearward ends respectively, all have substantial torsion strength. The principal functional units of the harvester are self contained, and pinned joints are used to facilitate their assembly to and removal from the harvester as modular units.

49 Claims, 10 Drawing Figures

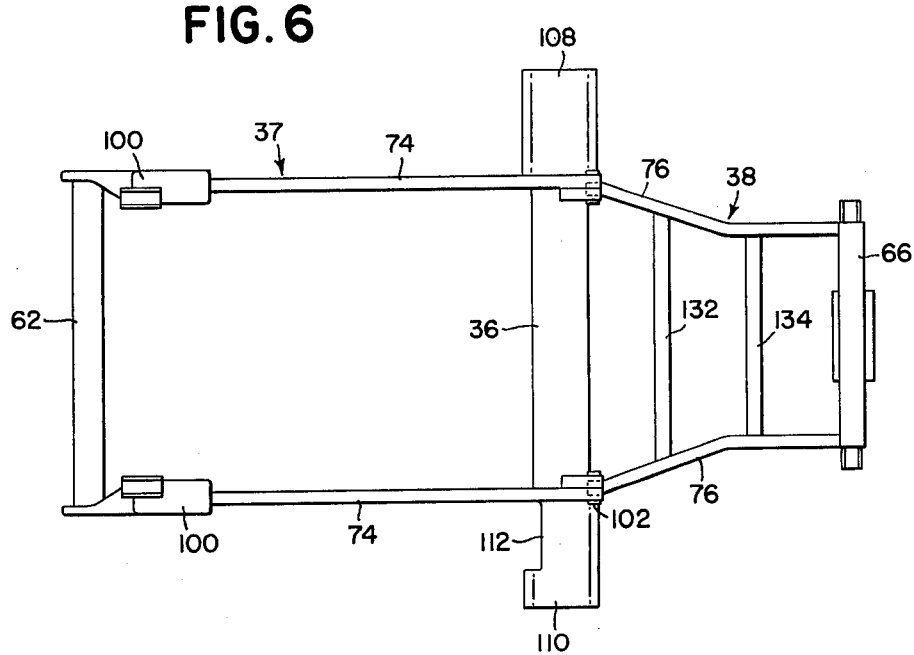
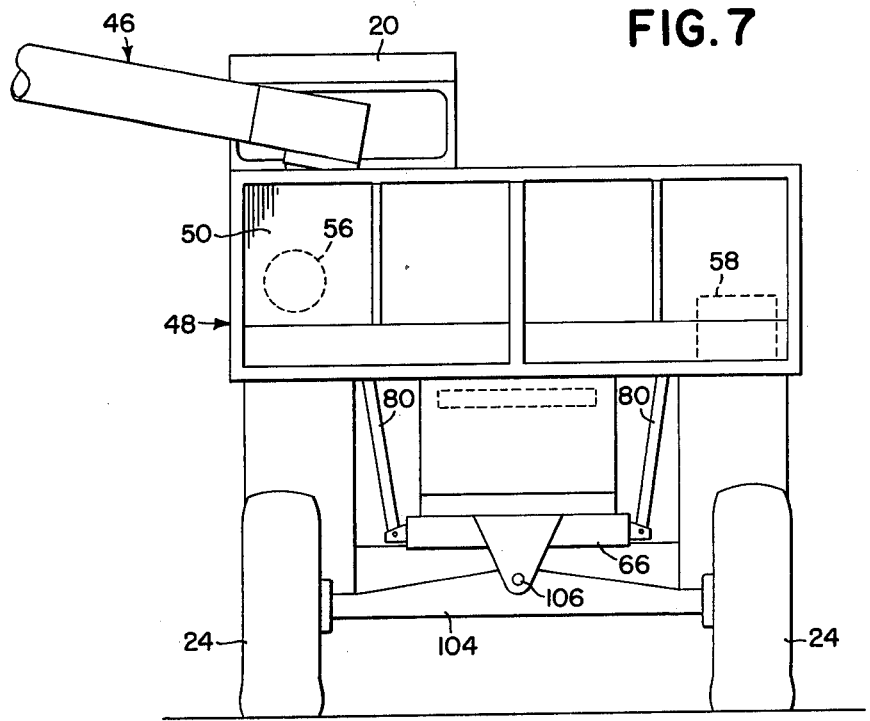

LEGEND  ○▶———◀○ MEMBER IN TENSION
        ○◀———▶○ MEMBER IN COMPRESSION

SELF-PROPELLED CROP HARVESTER

BACKGROUND OF THE INVENTION

This invention relates to a self-propelled agricultural crop harvester such as a combine and more particularly to improvements in frame construction, configuration, and arrangement of functional units in such a machine.

In spite of some sophisticated accretions, for example, in transmission and control systems and some refinements in gathering, threshing and conveying equipment, most current self-propelled combines still betray their origins in the threshing machines of the late 19th century.

However, economic trends are giving rise to an apparently insatiable demand for improvements in labor productivity and field efficiency and larger grain tanks and higher travel speeds are helping to achieve such improvements in performance. Both larger tanks and higher speeds require improved frame design and the limitations placed on overall vehicle size by transport requirements mean that larger grain tanks and stronger frames must be accommodated in a compact form. In some recent machines attempts have been made to rationalize configuration with such objects as reducing overall height, improving stability and convenience of service and repair while increasing grain tank size to match higher harvesting rates. But such attempts have generally been inhibited by the presence of the bulky and inflexible traditional threshing, separating and cleaning mechanisms and machines have tended to remain mobile agglomerations of components, with frames and configurations better suited to static application.

High performance, high capacity combines entail proportionately greater capital investment and potentially greater losses from any interruption of harvesting. Users complain that in current expensive and complex machines repair or replacement of major functional units is often costly or impractical because of the way in which such units are interdependently built into the structure.

SUMMARY OF THE INVENTION

In this invention a novel combination of configuration, treatment of functional units and structural concepts, creates a number of potential advantages for self-propelled crop harvesters, including manufacturing cost reduction, improvements in operation, durability, and functional versatility, and more convenience in service and repair. These advantages are particularly well realized in a self-propelled combine having an axial flow rotary crop processing unit, and the following discussion is directed to such a machine.

The characteristic features of the arrangement of functional units in this invention include the placing of the crop processing means and engine in tandem with the engine to the rear of the crop processing means, both being mounted low in the machine and supported in a horizontal subframe. A grain tank straddles the vehicle with saddle portions extending down to the horizontal subframe level on both sides and an upper central portion extending substantially the length of the basic machine. An operator's station is mounted forward of the grain tank, and provision is made for the forward mounting of means for gathering the crop and feeding it to the processing unit.

When this configuration is used with the improved frame structure (to be described below) it is economically and practically feasible to extend the saddle portions of the grain tank down to the lowest point of the frame. This factor, along with the low mounting of the crop processing means and engine results in a very low center of gravity, compared with conventional machines of this type, and improved lateral stability of the vehicle, whether loaded or unloaded, both in transport and when working on hillsides.

Another feature of the improved configuration is the feasibility of extending the grain tank up to the full length of the basic machine resulting in a ratio of grain holding capacity to machine size and weight of a much higher order than with existing conventional machines.

Another important result of the configuration is that the rear engine location and the grain tank arrangement gives the vehicle design engineer much greater freedom in choosing distribution of weight between front and rear axles. In particular it is possible to place a greater percentage of the total vehicle weight on the rear axle, with potential for improved steering control, tractive efficiency (when the rear wheels are powered) and improved fore-and-aft stability in operation and in transport, especially important with the wider and heavier forward mounted harvesting means now being used.

Appearance and safety of the machine also are improved greatly because the crop processing means and engine with their drives and control linkages are generally shielded by the saddle portions of the grain tank. Placing of the vertical conveyor of the unloading system inside the grain tank keeps the side of the machine clean in appearance and reduces its overall width.

Additional advantages realizable with the configuration of the present invention are reduced height to the top of the grain tank providing a better field of vision for the operator, and adequate clearance at the rear of the machine for whatever wheel size is necessary, for example, the relatively larger wheels which may be desirable for rear wheel drive.

Yet another advantage of the invention is that the engine location, lower and to the rear, is remote from the operator thus reducing the discomforts of heat and noise and making it more conveniently accessible from the ground for service.

Another key feature of the invention is the design of functional units to be self contained whereby any one of the basic units (such as crop processing means, engine, grain tank with unloading auger, or operator's station) which in conventional machines are usually structurally interdependent and inseparable, may be assembled to or removed from the combine as modules, independently. This is especially convenient when joints with removable pins are used between units or between units and frame as in this invention. Breaking the basic machine down thus, into functional modules plus a horizontal subframe, creates possibilities for separate handling and interchangeability of units which fill a long felt need for simplified assembly at the factory, more convenience in service and repair or replacement of units, and more versatility in the marketplace by equipping a given model for different crops or with different sized engines, or even grain tanks, from minimum for a medium inventory of different units.

The features of configuration and self-contained functional units described above work well with the structural concept of the invention. An important aspect of this is the use of a truss form for the upright frame sides, in conjunction with a horizontal subframe which includes torque tubes as transverse members. Elements in this structure serving a dual purpose, structural as well as operational, are the grain tank, especially the inner and bottom walls of the saddle portions, and also the housing of the transverse auger conveyor, joining the saddle portions of the tank. Single struts (one each at front and rear of each of the frame sides) are the only members acting solely as structural braces. Attaching points for the functional units and front and rear axle assemblies are kept as close as possible to the joints of the frame sides so as to make most efficient use of the truss frame form in which, ideally, as is well known, loading of each member is solely longitudinal. An important object of the invention is thus realized — efficient use of an efficient structure to minimize the size of members and their cost.

BRIEF DESCRIPTION OF THE DRAWINGS

FIG. 6 is a somewhat schematic plan view showing the principal horizontal subframe elements.

FIG. 7 is a rear elevation of the combine.

DESCRIPTION OF THE PREFERRED EMBODIMENT

Figure 1:
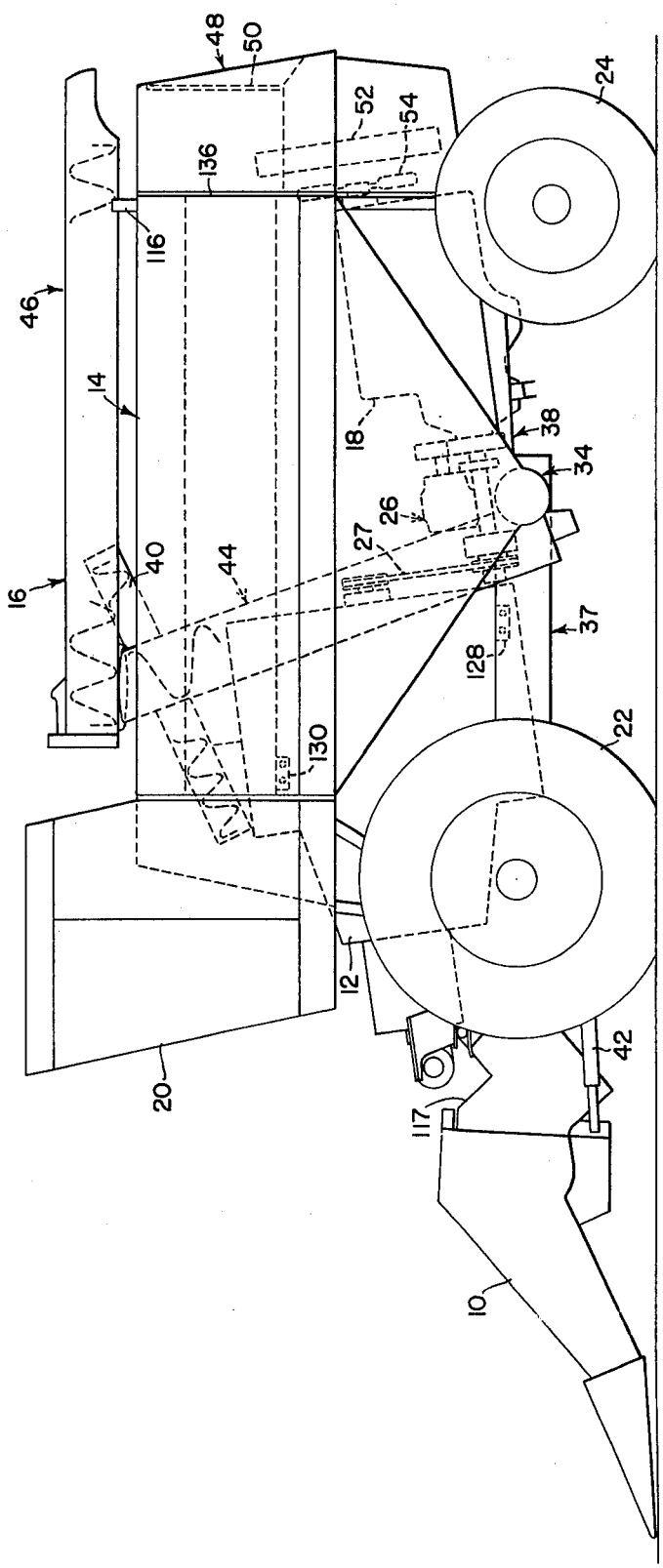
FIG. 1 is a somewhat schematic left side elevation of a combine embodying the invention, with some of the functional units shown in broken lines.
Figure 2:
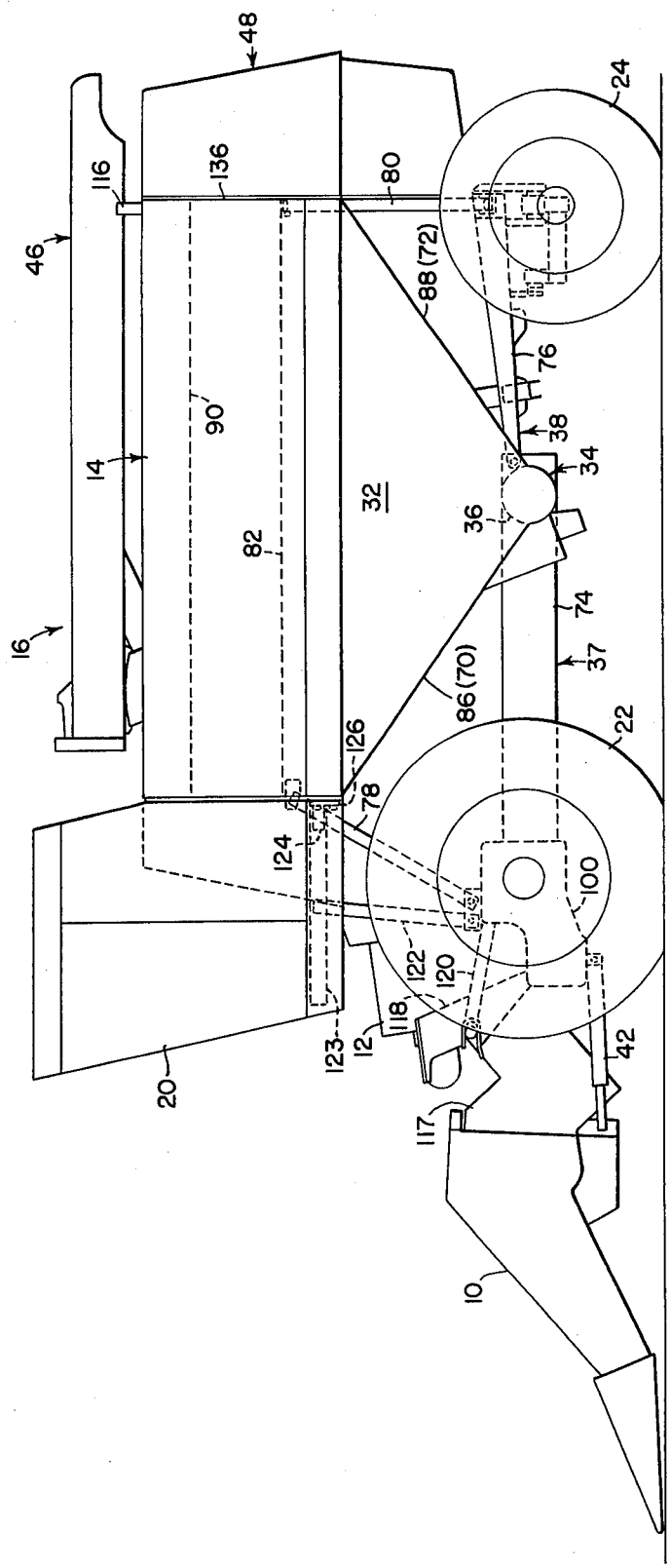
FIG. 2 is similar to FIG. 1, but showing particularly the principal structural elements.

The invention is embodied in a self-propelled combine shown in its entirety in FIGS. 1 and 2.

Functional units of the combine include crop harvesting means, such as a corn head 10 at the front of the machine for removing the crop from the field, a crop processing unit 12, crop handling means including a grain tank 14 and an unloading conveyor system 16, an engine 18, and an operator's station 20. Front wheels 22 and rear wheels 24 support the combine above the ground, and conventional drive means are provided for transmitting power from the engine to the wheels and to the other functional units, the drive means including a main hydraulic pump 26 directly driven by the engine 18 and a belt drive 27 that drives the processing unit 12.

Figure 3:
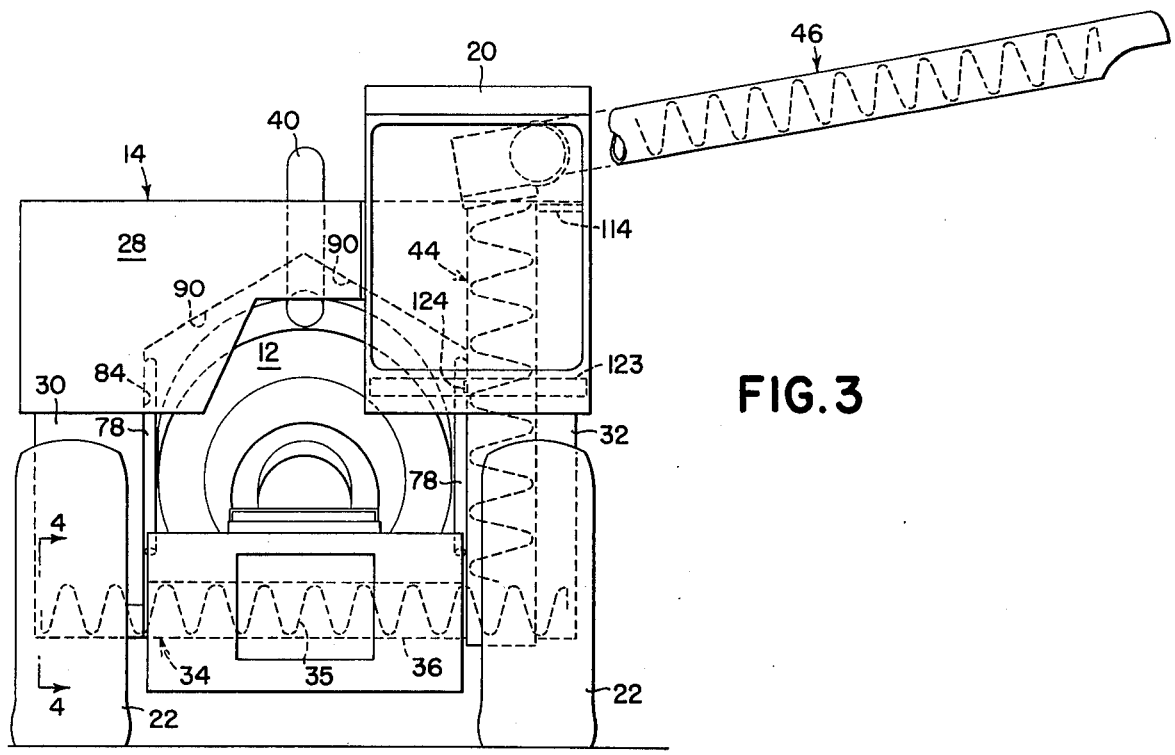
FIG. 3 is a front elevation of the combine shown in FIG. 1 with the crop gathering and feeding means removed.

Turning to FIGS. 1, 2 and 3 and considering the arrangement of functional units in detail, it is seen that an important feature is the large capacity saddle-type grain tank 14 which straddles the harvester. The tank includes an elevated central portion 28, which communicates with two depending saddle portions, 30 and 32, on opposite sides of the machine. A transverse auger conveyor 34 extends between the lower extremities of the saddle portions, and includes an auger 35 mounted in a tubular housing 36 that is connected to the opposite grain tank saddle portions adjacent its opposite ends. Extending from the junctions of the tank and the conveyor housing 36 are forward and rear horizontal subframes, which are best shown in FIG. 6 and indicated generally by the numerals 37 and 38 respectively. As shown in FIG. 3, a tunnel-like space is thus formed in which the horizontal subframes from the floor and the grain tank the sides and roof.

Towards the forward end of this tunnel space, the crop processing unit 12 is mounted. The configuration described is particularly adaptable to an axial flow rotary unit as illustrated in outline in FIGS. 1 and 3. Such units are well known and may combine the functions of threshing, separating and cleaning the grain. An upwardly and rearwardly inclined conveyor 40 delivers processed clean grain from the crop processing unit upwards into the grain tank 14. The engine 18 is mounted towards the rear of the tunnel.

Pivotally connected to the front of the processing unit is the corn head 10, and hydraulic cylinders 42 control its height above the ground as is well known.

The auger conveyor 34 forms a part of the unloading conveyor system 16, which also includes a second auger conveyor 44 that extends upwards from the transverse auger conveyor 34 within the left-hand saddle tank portion 32. A swingble discharge auger conveyor 46 is mounted at the upper end of the conveyor 44. The grain unloading system 16 is more fully described in copending application Ser. No. 656,321.

Mounted at the rear of the grain tank and above the engine is an enclosure 48, in the rear walls of which are screened openings 50, shown in FIG. 7, to filter cooling air being drawn via a plenum chamber (not shown) over an engine radiator 52 by a fan 54. This enclosure also houses an engine air cleaner 56, so that engine combustion air is also prescreened, and a combine battery 58. As is apparent, the top and side walls of the enclosure 48 are flush with top and sides of the grain tank.

The principal structural or frame components consist of a pair of upright truss frame sides 60 of three bays each, (see FIGS. 8 and 9) with three principal transverse horizontal members extending between the three lower joints of the trusses (see FIG. 6). These transverse members are a front axle assembly 62, the transverse conveyor housing 36 and a rear axle support 66. Note that the portions of all three of these members between the side truss frames are hollow sections having considerable torsional strength.

Originating from a central lower joint 68 of each truss frame side 60 are forward 70 and rear 72 diagonal members and forward 74 and rear 76 longitudinal members. The joint 68 is at the connection of the auger housing 36 to the opposite frame sides. Each truss frame side 60 is completed by generally upright forward and rear struts 78 and 80 respectively and an upper member 82.

Figure 8:
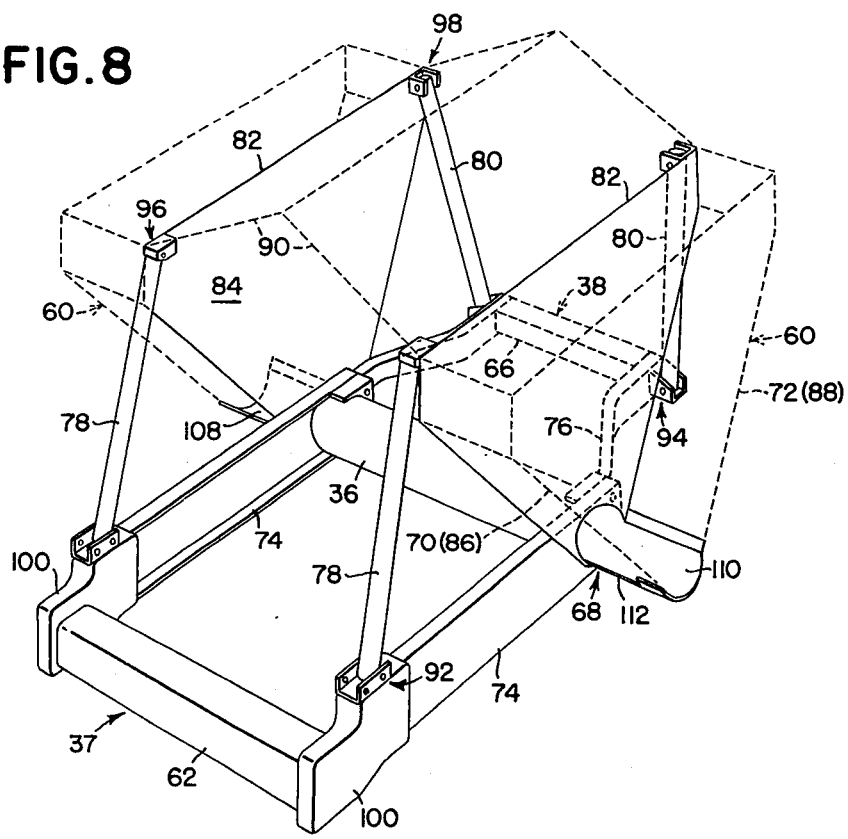
FIG. 8 is a somewhat schematic left front perspective of the principal structural elements of the combine.
Figure 9:
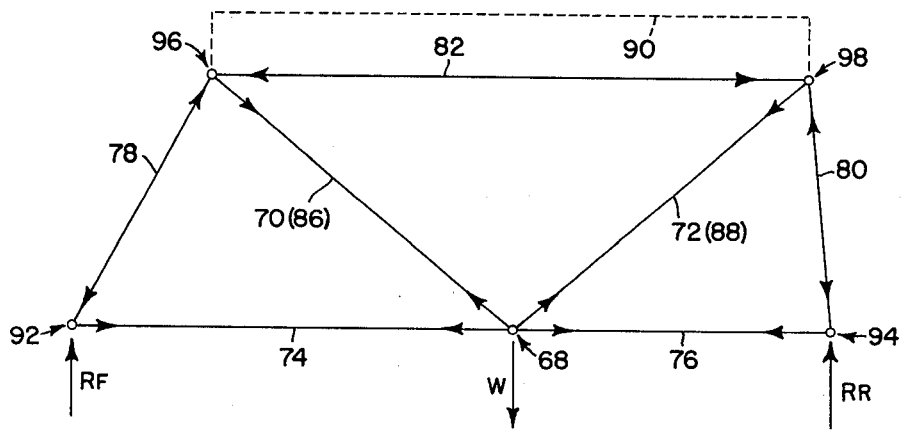
FIG. 9 is a left-hand elevation line diagram of the elements of one of the truss frame sides.

Discussing the structure in more detail and referring to FIGS. 2, 8 and 9, the grain tank 14 is an important part of the structure. The depending saddle portions of the tank have opposite, upright inner walls 84 that define the center bays of the truss frame sides. Each saddle portion of the tank has a pair of downwardly converging front and rear walls 86 and 88 respectively that tangentially merge into the housing 36 and form the bottom of the saddle portions. The center portion of the tank has a fore-and-aft ridged floor 90 that extends between the upper edges of the opposite inner walls 84. In structural terminology, the center bay is thus solid but in discussion we will treat it as a conventional open bay in which the members composing it, diagonals 70 and 72 and upper member 82, comprise indeterminate sections of the tank inner walls 84 and the adjacent tank floor sections, forward and rear downwardly converging saddle portion walls, 86 and 88 respectively, and the floor 90 of the tank center portion.

The forward bays of the truss frame sides 60 are completed by the upwardly extending struts 78, pinned at each end at joints 92 and 96 and extending from the front of the forward lower members 74 to the forward end of the upper members 82.

The rear bays of the sides are completed by struts 80, similar to the forward struts 78 and pinned at their lower and upper ends at joints 94 and 98 to the rear of the rearward longitudinal members 76 and to the rear end of the upper members 82 respectively.

A truss frame side 60 is represented in diagrammatic form in FIG. 9. For purposes of determining the usual direction of forces in the various members and at the joints, it is sufficient to approximate the external forces acting on the truss frame as shown in the diagram. It is assumed that when the combine is at rest, or in a state of uniform motion over the field, the supporting forces applied to the frame through the wheels, indicated in FIG. 9 by $R_F$ at the front and $R_R$ at the rear, are vertically upwards and are applied to the truss frame sides through the axle assemblies at joints 92 and 94 respectively. The weight and location of the center of gravity of the combine are indicated by the vector W, and as long as there is an upward reaction at joints 92 and 94, that is, as long as the front and rear wheels each support part of the total weight of the combine (which they must for stability), then the center of gravity of the combine and its contents necessarily lies between the front and rear wheels, in some such position as indicated by the vector W in FIG. 9. Then, applying the well-known principles of statics, the direction of forces in the members and at the joints of the truss will be as indicated by the arrows on the various members in FIG. 9. It will be seen then that the upper member 82 is in compression and that diagonal members 70 and 72 are in tension. The tank inner wall 84 and adjacent wall and floor sections 86, 88 and 90 which comprise these members are well adapted to bear these loads but, if desired, they may easily be reinforced by attaching to them additional members, such as flat straps between the upper joints 96 and 98 and center joint 68 respectively to increase the tensile strength of the diagonal members 70 and 72, and structural angle between upper joints 96 and 98 to increase the compressive strength of member 82. However, such reinforcing members have been omitted from the drawings for clarity.

Continuing now the detailed description of the combine structure and referring to FIGS. 6 and 8, note that longitudinal members 74 and 76 serve both as lower members of the upright truss frame sides 60 and as members of the subframes 37 and 38. The front axle assembly 62 extends transversely between the forward ends of the forward longitudinal members 74 and is rigidly attached to them by adapter brackets 100. These members, along with the transverse conveyor housing 36 comprise the forward horizontal subframe 37.

The forward longitudinal members 74 embrace the transverse conveyor housing 36 and extend a short distance to its rear to provide attaching points for the rear horizontal subframe 38 which includes the rear longitudinal members 76 and, attached rigidly at their rear extremities, the transverse rear axle support 66. The rear subframe 38 is secured to the rearward extensions of the forward longitudinal members by transverse pivot means such as removable pins 102. A rear axle 104 is carried beneath the rear axle support 66 by fore-and-aft pivot means 106 (see FIG. 7).

Figures 4, 5:
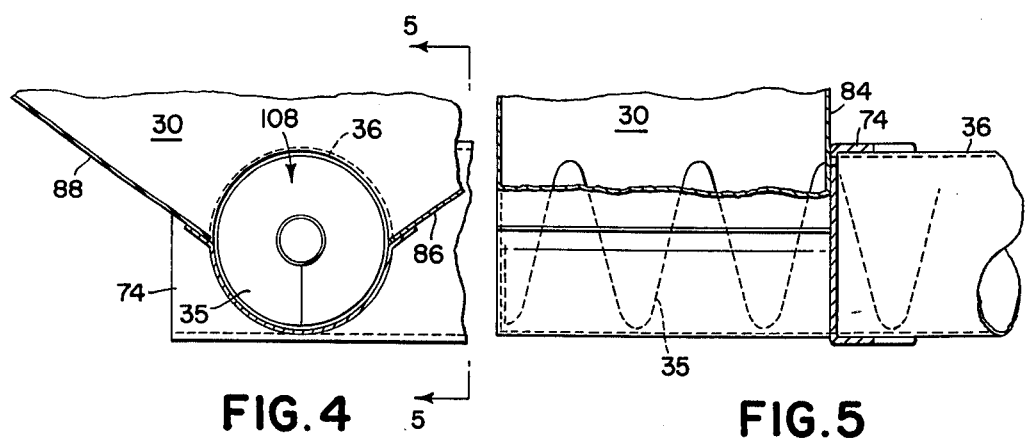
FIG. 4 is an enlarged partial sectional view on a vertical fore-and-aft plane transverse to the transverse auger, showing the junction of the auger housing with the right-hand saddle portion of the grain tank, as viewed on the line 4—4 of FIG. 3.
FIG. 5 is an enlarged partial sectional view on a vertical plane through the center line of the transverse auger showing the junction of the auger housing with the right-hand saddle portion of the grain tank and the forward longitudinal frame member as viewed along the line 5—5 of FIG. 4.

At the lower center joints 68 of the truss sides 60 (right-hand joint is shown in FIGS. 4 and 5), both the saddle sections of the tank and the forward longitudinal members 74 are rigidly attached to the transverse conveyor housing 36, which extends outwardly beneath the saddle portions 30 and 32 of the tank on both sides of the machine. In the portion of conveyor housing within the saddle portions, there are upward directed openings, 108 on the right-hand side and 110 on the left-hand side. The opening 108 on the right-hand side permits the auger 35 within to receive grain from the right-hand saddle tank portion 30 for transfer to the other side of the machine. The conveyor housing opening 110 on the left-hand side of the machine receives grain from the left-hand saddle portion of the tank 32 and the transverse auger conveyor diverts it, along with grain transferred from the right-hand saddle tank, through a notched portion 112 of the housing into the upright conveyor 44 for upward movement and unloading.

The upright conveyor 44 is carried within the left-hand saddle portion of the tank 32 and is supported towards its upper end by a bracket 114 extending from the front upper left-hand corner of the tank as shown in FIG. 3. The swingable unloading conveyor 46 is supported, when in transport position, by a saddle bracket 116 mounted at the rear upper left-hand corner of the tank.

That completes a description of the essentials of the structure of the combine and that part which embodies the main invention. Proceeding now to structural provisions for the remaining functional units (the grain tank and materials handling system were described above), the corn head 10, is supported on the front end of a feeder housing 117 that is supported by and pivoted in a pair of brackets 118 rigidly attached to the front axle assembly 62 and braced by a pair of braces 120 to the front axle adapter brackets 100, the feeder housing being adapted to deliver crop material from the corn head 10 to the processing unit 12.

An operator's station 20 is supported at three points, (a) by a strut 122 rigidly attached to the floor 123 of the operator enclosure and extending downwards to be pinned to the left-hand front axle adapter bracket 100, (b) by a clamp 124 (shown in FIGS. 2 and 3) to the strut 78 where it passes through the floor 123 of the operator enclosure, and (c) a bolted connection 126 to the left-hand front corner of the grain tank.

The crop processing unit is supported between the forward longitudinal frame members 74 and upper members 82 by brackets such as 128 and 130, respectively.

The engine is carried by the rear subframe 38 and is mounted on transverse members 132 and 134 of the subframe and the rear axle support 66.

The radiator air intake housing assembly 48 is attached transversely to the upper rear wall 136 of the grain tank.

In essence, the structure consists of two opposite upright truss frame sides 60 and, extending between them, forward and rear horizontal transverse subframes 37 and 38 which include the lower members 74 and 76 of the truss frame sides. The three principal transverse members are rigidly attached to and extend between the three opposite bottom joints of the truss frame sides and each has substantial torsional strength.

The principal sources of loads for this structure are (a) the weight of the tank and contents with its center of gravity concentrated above the transverse conveyor 34, (b) the weight of the crop processing unit 12, mounting points for which have been chosen as close to truss joints 68, 92 and 96 as possible, (c) the engine 18 which is mounted so as to distribute its weight between truss joints 68 and 94, (d) the crop harvesting unit which, when held at any given position by the hydraulic cylinders 42, is in effect cantilevered forward from the lower frame members 74 and induces a bending moment in them, and (e) reaction at the truss joints 92 and 94 from the ground-engaging wheels 22 and 24 which support the complete harvester above the ground.

In operation in field or transport, the wheels on their opposite sides are typically unequally loaded, for example, because of uneven terrain, and consequently there is a racking of the frame - that is a tendency for relative displacement between the two side frames within their respective upright planes. Because of the essentially rigid nature of the truss frames 60, this racking is translated into twisting forces in the horizontal subframes 37 and 38 which are resisted by the torsional strength of the front axle assembly 62, the transverse conveyor housing 36 and the rear axle support 66. The respectively large diameter necessary for the conveyor function of the housing 36 makes it a very effective torque tube and of major importance in the structure.

From the foregoing description it will be clear that the structural system facilitates a "modular" treatment of the principal functional units of the harvester, in which they are designed to be self-contained units, each with its own structural integrity, which can be assembled to or removed from the harvester for repair or replacement independently of other units with a minimum number of control and drive connections necessary to make the harvester an operating whole.

Figure 10:
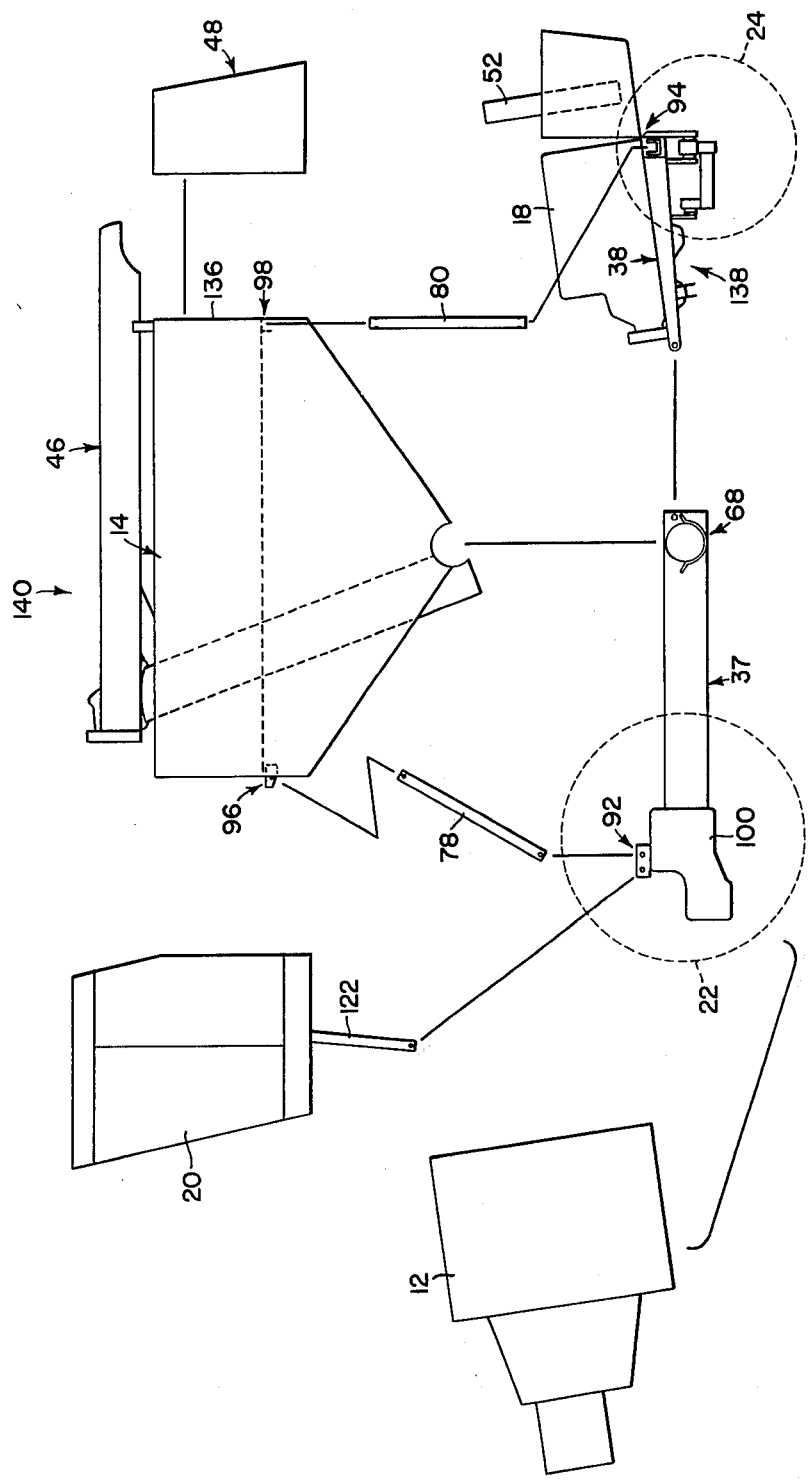
FIG. 10 is an exploded schematic showing the functional unit modules in left side elevation.

To illustrate one aspect of the modular design we will describe one possible sequence of the principal steps in assembling a complete harvester, referring to FIG. 10.

The forward subframe 37 complete with auger (not shown) is supported above the ground while the front wheels 22 are mounted in the conventional way.

Next the engine and rear axle assembly 138, including subframe 38 and engine 18, complete with rear wheels 24 conventionally attached to the rear axle, is brought forward and secured with pins 102 to the rear of the forward subframe 37.

Next the crop processing unit 12 is cradled in and secured in the forward subframe 37.

Next the grain tank and conveyor assembly 140 is lowered into position and bolted to the auger housing 36 while forward and rear struts 78 and 80 respectively are pinned at their upper ends to the front and rear corners of the tank at joints 96 and 98 and at their lower ends to the front of the forward subframe 37 at joint 92 and to the rear subframe 38 at joint 94.

Next the radiator screen housing assembly 48 is attached to the rear wall of the grain tank 136.

Next the operator station assembly 20 may be put in position with its support strut 122 attaching to the front axle adapter bracket 100, its floor 123 clamped to strut 78 and attached to the front of the tank by bracket 126.

All that remains is to complete the drive and control connections and mount an appropriate forward mounted harvesting unit in the conventional way.

In harvesting operation the harvesting unit 10 delivers untreated crop material to the processing means 12 from which clean grain is delivered to the grain tank 14 by auger conveyor 40. This auger delivers grain into the tank on the fore-and-aft center line of the machine and, because the tank symmetrically straddles the machine, distribution of grain between the two sides of the tank while filling is sufficiently uniform that no auxiliary means of leveling, such as a transverse auger within the upper portion of the tank are needed. Because of the low center of gravity of the combine and its inherent stability, uneven filling or emptying of the two saddle portions of the tank which may occur in some circumstances can easily be tolerated.

In unloading, the downward converging floors 86 and 88 of the saddle portions of the grain tank direct grain to the transverse auger conveyor 34. This conveyor is operable to transfer grain from the right-hand saddle tank portion 30 to the left 32 and also to deliver grain from both sides into the upright auger conveyor 44. At the head of the upright conveyor grain is transferred into the swingable unloading conveyor 46 for discharge into a receptacle such as a grain wagon or truck.

From the foregoing it can be seen that in this invention a novel structural concept combines with an intelligent configuration of functional components and application of the principle of modularity to produce a result which fully achieves the advantages set out in the Summary of the Invention.

We claim:

1. In a self-propelled combine adapted to advance over a field and having a plurality of wheels, an engine, an operator's station, a crop processing means and crop handling means adapted to receive crop material from the processing means, the combination therewith of a improved frame for supporting the engine, crop processing means, the crop handling means and the operator's station on the wheels and comprising:
    first and second generally fore-and-aft, opposite, upright frame sides, each side including upper and lower vertically spaced, fore-and-aft frame elements, front and rear approximately upright frame elements respectively interconnecting the upper and lower frame elements and at least one diagonal element disposed between said upright elements having one end connected to an upper fore-and-aft element and its other end connected to a lower fore-and-aft element so that the frame side is in the form of a truss;
    a plurality of lateral frame elements interconnecting the frame sides and including a torsion resistant tubular member rigidly connected to the frame sides at opposite connections between a diagonal and a lower element; and
    means connecting the frame sides to the wheels.

2. The invention defined in claim 1 wherein the tubular member connecting the frame sides at opposite connections between a diagonal and a lower element comprises a transverse auger housing.

3. The invention defined in claim 2 wherein each lower frame element includes a front portion extending forwardly from the auger housing, a rear portion extending rearwardly from the auger housing and transverse pivot means adjacent said housing pivotally connecting the front and rear portions.

4. The invention defined in claim 3 wherein the frame includes a transverse rear axle support element interconnecting the frame sides generally at the point of connection of the rear upright elements to the lower frame elements and a rear axle structure pivotally connected to the rear axle support element and supported on a pair of said wheels, and including an engine mounted on the rear portions of the lower frame elements and the rear axle support, removable pin means operatively associated with the rear upright elements to permit separation of the rear portions of the lower frame elements from the upper frame elements, the transverse pivot means also being removable to permit separation of the rear portions of the lower frame elements from the front portions.

5. In a self-propelled combine adapted to advance over a field and having a plurality of wheels, an engine, an operator's station, a crop processing means, and crop handling means adapted to receive crop material from the processing means and including a grain tank mounted on the frame and including an elevated central portion and a pair of transversely spaced, saddle portions depending from the opposite sides of the central portions and transverse conveyor means interconnecting the saddle portions below central portion, the combination therewith of an improved frame for supporting the engine, the crop processing means, the crop handling means and the operator's station on the wheels and comprising:

first and second, generally fore-and-aft, opposite, upright frame sides, each side including upper and lower vertically spaced generally fore-and-aft frame elements, said lower elements lying in approximately the same horizontal plane as the transverse conveyor means, front and rear, approximately upright frame elements respectively interconnecting the upper and lower frame elements, and at least one diagonal element disposed between said upright element having one end connected to an upper fore-and-aft element and its other end connected to a lower fore-and-aft element so that the frame side is in the form of a truss;

a plurality of lateral frame elements interconnecting the frame sides; and means connecting the frame sides to the wheels.

6. The invention defined in claim 5 wherein the crop processing means includes a rotary separator means having a generally fore-and-aft axis and mounted on the frame between the saddle portions and below the central portion of the grain tank and above the transverse conveyor.

7. The invention defined in claim 6 wherein each saddle portion includes a first downwardly inclined wall that at least partially forms one of said diagonal frame elements.

8. The invention defined in claim 7 wherein each saddle portion extends a second downwardly inclined wall converging with the first and at least partially forming a second diagonal element of the opposite frame sides.

9. The invention defined in claim 8 wherein the conveyor means includes a tubular auger housing rigidly connected to and communicating with the opposite saddle portions adjacent the point of convergence of the inclined walls of the saddle portions.

10. The invention defined in claim 9 and including a front axle structure interconnecting the opposite frame sides adjacent the forward ends of the lower frame elements and supported on a pair of said wheels, wherein the front frame elements are inclined upwardly and rearwardly from the front axle structure and have their upper ends connected to the grain tank adjacent the forward end thereof.

11. The invention defined in claim 10 wherein the operator's station is disposed immediately in front of the grain tank and includes means removably mounting the operator's station on the frame.

12. The invention defined in claim 11 wherein the operator's station mounting means includes a generally upright support member removably attached to and extending upwardly from one of the frame sides adjacent the front axle structure.

13. In a self-propelled combine adapted to advance over a field and having a plurality of wheels, an engine, an operator's station, a crop processing means and crop handling means adapted to receive crop material from the processing means, the combination therewith of an improved frame for supporting the engine, the crop processing means, the crop handling means and the operator's station on the wheels, and comprising:

first and second generally fore-and-aft, opposite, upright frame sides, each side including upper and lower vertically spaced, generally fore-and-aft frame elements, front and rear approximately upright frame elements respectively interconnecting the upper and lower frame elements and front and rear diagonal elements respectively connected to the upper fore-and-aft frame element adjacent respective connections between said fore-and-aft element and said front and rear upright elements and connected to the lower frame elements at substantially the same point so that each frame side is in the form of a truss having three triangular bays;

a plurality of lateral frame elements, approximately in the plane of the lower fore-and-aft frame elements, extending between and rigidly attached to the opposite frame sides; and means connecting frame sides to the wheels.

14. The invention defined in claim 13 wherein the crop handling means includes a grain tank mounted on the frame and including an elevated central portion and a pair of transversely spaced, saddle portions depending from the opposite sides of the central portions and transverse conveyor means interconnecting the saddle portions below central portions.

15. The invention defined in claim 14 wherein the crop processing means includes a rotary separator means having a generally fore-and-aft axis and mounted on the frame between the saddle portions and below the central portion of the grain tank.

16. The invention defined in claim 14 wherein each saddle portion includes downwardly converging front and rear walls that respectively at least partially form the front and rear diagonal elements of the opposite frame sides.

17. The invention defined in claim 14 wherein the conveyor means includes a transversely extending tubular auger housing rigidly connected to and communicating with the bottom of the opposite saddle portions, said auger housing forming one of the lateral frame elements.

18. In a self-propelled crop harvester having a plurality of functional units including an engine and a processing unit for processing crop material, the improvement comprising:
two opposite upright fore-and-aft extending truss frame sides each of which includes a plurality of members, including upper and lower, fore-and-aft extending members and connecting members extending between the upper and lower members, connected together at their ends in upper and lower joints so as to form at least two contiguous bays, triangular in shape and lying generally in a common plane, at least one joint including transverse pivot means having removable pins whereby the members are pivotally and releasably connected;
a plurality of transverse members joining the opposite truss frame sides, said upright frame sides and transverse members together defining a space for at least one of said functional units and forming a supporting structure therefore, at least one of said functional units being mounted on the supporting structure within said space; and
two transverse axle assemblies each including a pair of ground-engaging wheels and each carried by said supporting structure, at least one of the axle assemblies being carried adjacent to one of the lower joints between members of the respective frame sides, so that the machine supporting forces transmitted from the wheels through said axle are applied to the supporting structure adjacent to said joint.

19. The invention defined in claim 18 wherein at least one of the functional units is self contained and adapted to be assembled to and disassembled from the harvester as a unit, such a unit constituting a module of the harvester.

20. In a self-propelled crop harvester having a plurality of functional units including an engine and a processing unit on the machine for processing crop material, and having a tank module for temporary storage of the crop material after processing, said module having a grain tank and conveying means, the grain tank having upright side walls with triangular lower sections, the improvement comprising:
two opposite, upright, fore-and-aft extending truss frame sides, each of which includes a plurality of members, including upper and lower, fore-and-aft extending members and connecting members extending between the upper and lower members connected together at their ends in upper and lower joints so as to form at least two contiguous bays, triangular in shape and lying generally in a common plane, the triangular lower sections of the grain tank side walls coinciding with one of said bays;
a plurality of transverse members joining the opposite truss frame sides, said upright frame sides and transverse members together defining a space for at least one of said functional units and forming a supporting structure therefor, at least one of said functional units being mounted on the supporting structure within said space; and
two transverse axial assemblies, each including a pair of ground-engaging wheels, and each carried by said supporting structure, at least one of the axial assemblies being carried adjacent to one of the lower joints between members of the respective frame sides so that the machine supporting forces transmitted from the wheels through said axial are applied to the supporting structure to said joint.

21. The invention defined in claim 20 wherein one bay of each truss frame side is formed by a continuous panel of structural material, one of said vertical tank side walls constituting such a panel, the tank walls thus being load-bearing components of the frame sides.

22. The invention defined in claim 21 wherein the grain tank has an elevated central portion and a pair of depending portions arranged so as to straddle the harvester and wherein said transverse members include a conveyor housing extending between the depending portions of the tank, each end of the conveyor housing being attached rigidly to the tank portions so that housing and tank portions together form a structural unit.

23. In a self-propelled crop harvester having a plurality of functional units including an engine and a processing unit on the machine for processing crop material, the improvement comprising:
two opposite, upright, fore-and-aft extending truss frame sides, each of which includes a plurality of members including upper and lower fore-and-aft extending members and connecting members extending between the upper and lower members connected together at their ends in upper and lower joints so as to form at least two contiguous bays, triangular in shape and lying generally in a common plane;
a plurality of transverse members joining the opposite frame sides, said upright frame sides and transverse members together defining a space for at least one of said functional units and forming a supporting structure therefor, at least one of said functional units being mounted on the supporting structure within said space and at least one of the transverse members being a torsion-resisting tubular member connecting the frame sides adjacent opposite joints of said sides, said tubular member being rigidly attached adjacent each of its ends to at least one of the frame side members extending from the joint and cooperating with said side members to form a transverse subframe.

24. The invention defined in claim 23 wherein at least one of the functional units is generally self contained and adapted to be assembled to and disassembled from the harvester as a unit, such a unit constituting a module of the harvester.

25. The invention defined in claim 23 wherein the self-propelled crop harvester includes transverse conveyor means including a conveyor housing and operable to convey crop materials from one side of the harvester to the other, said conveyor housing comprising said tubular transverse member of the transverse subframe.

26. The invention defined in claim 25 wherein at least one of the functional units is generally self contained and adapted to be assembled to and disassembled from the harvester as a unit, such a unit constituting a module of the harvester.

27. The invention defined in claim 26 wherein said module includes connecting means for mounting it in the supporting structure, the connecting means including removable pins so that the module is pivotally connected to the supporting structure, and easily disassembled from it.

28. The invention defined in claim 27 wherein said module includes the engine, a rear axle assembly and a subframe which supports the engine and axle assembly.

29. The invention defined in claim 26 wherein the self-propelled crop harvester includes an operator control station, said station being a module of the harvester.

30. The invention defined in claim 29 wherein at least one of the modules includes connecting means for mounting it in the supporting structure, the connecting means including removable pins so that the module is pivotally connected to the supporting structure and easily removed.

31. In a self-propelled crop harvester having a plurality of functional units including an engine, harvesting means for removing the crop material from the field, and a processing unit on the machine adapted to receive the crop material from the harvesting means, the improvement comprising:
a supporting structure having a pair of opposite fore-and-aft extending upright frame sides and supporting at least one of the functional units of the harvester between the sides, said sides being in the form of trusses, each of which includes a plurality of members connected together at their ends in a plurality of joints so as to form at least two contiguous bays, generally triangular in shape and lying generally in a common plane; and
a conveyor means extending between the sides and including a tubular housing, said conveyor housing being connected rigidly adjacent each end to said sides adjacent a pair of opposite joints so that together the sides and the conveyor housing form a structural unit.

32. A self-propelled combine comprising: a mobile main frame having opposite frame sides, said frame sides including opposite fore-and-aft extending lower elements, front and rear;
a crop processing means mounted on the main frame and including a rotary separator means having a generally fore-and-aft axis;
a crop handling means mounted on the frame and adapted to receive crop material from the processing means and including a grain tank, having an elevated central portion including a floor having a fore-and-aft extending ridge and a pair of saddle portions depending from the opposite sides of the central portion and disposed on opposite sides of the separator means, said ridged floor being disposed so that crop material received by the central portion may flow by gravity into the saddle portions;
a transverse auger-type conveyor interconnecting the bottoms of the saddle portions below the axis of the separator means, and including a tubular housing rigidly joined adjacent its ends to the opposite front lower elements of the frame sides adjacent their rearward ends; and
a front axle structure interconnecting the opposite frame sides and rigidly joined the the front lower elements of said frame sides adjacent their forward ends, said front lower elements, conveyor housing and front axle structure cooperating as a rigid transverse subframe of said main frame.

33. The invention defined in claim 32 wherein each frame side includes upper generally fore-and-aft frame elements, front and rear, vertically spaced from said lower elements, approximately upright frame elements respectively interconnecting the upper and lower frame elements, and at least one diagonal element having one end connected to an upper fore-and-aft element adjacent to the connection between said fore-and-aft element and one of said upright elements and its other end connected to a lower fore-and-aft element at a point spaced from the connection between the upright elements and the fore-and-aft elements so that the frame side is in the form of a truss.

34. The invention defined in claim 33 wherein each saddle portion includes inclined downwardly converging front and rear walls having their lower ends connected to the auger housing, said front and rear walls at least partially forming the diagonal elements in the respective frame sides.

35. A self-propelled combine comprising:
a mobile main frame having opposite upright fore-and-aft frame sides and a plurality of transverse frame elements interconnecting said sides, one of said elements being formed by a transverse front axle structure including ground-engaging drive wheels at the opposite ends;
a grain tank mounted on the frame and including an elevated central portion and transversely spaced vertically extending saddle portions depending from the opposite sides of the central portion and lying within the upright planes of the respective frame sides;
an operator's station mounted on the frame above the front axle structure and immediately in front of the grain tank;
a rotary crop separating means having a generally fore-and-aft axis and carried by the frame below the central portion of the grain tank, between the saddle portions of the grain tank, and above the front axle structure;
and engine having an output shaft mounted on the frame rearwardly of the separating means below the central portion of the grain tank and between the saddle portions of the grain tank, said output shaft being below the axis of the separating means; and
a transverse rear axle structure connected to the frame generally below the engine and including a pair of steerable rear wheels at its opposite ends.

36. The invention defined in claim 35 and including means removably mounting the operator's station on the frame, and wherein the frame includes a rear portion carrying the engine and the rear axle structure and means removably connecting the rear portion of the frame to the rest of the frame.

37. The invention defined in claim 35 wherein the central portion of the grain tank includes a horizontal top and the saddle portion includes outer side walls, and the combine includes a rear hood structure having a wall with a filtered air intake, a top wall generally flush with the grain tank top, and outer side walls generally flush with the outer side walls of the saddle portions, the engine including radiator means, and blower means adapted to move air sequentially through the filtered air intake and the radiator means.

38. A self-propelled harvester comprising:
a main frame including a grain tank, the tank having an elevated central portion and first and second depending saddle portions communicating with it and straddling the harvester, the saddle portions having downwardly converging front and rear floor sections, a tranverse conveyor housing extending between the saddle tank portions and rigidly attached thereto, generally at the convergence of said tank floor sections, and front and rear axle structures and opposite lower fore-and-aft side members extending between said housing adjacent the convergence of said tank floor sections and said axle structures, said transverse conveyor housing, front and rear axle structures and side members constituting a bottom frame means, and the tank and the bottom frame means cooperating to define a tunnel;

a crop processing unit mounted on the frame towards the forward end of said tunnel below the grain tank and substantially above the bottom frame means and operable to receive crop at its forward end and process it;

discharge means mounted on the frame and operable to deliver processed grain upwards from the processing unit into the elevated central portion of the grain tank;

means mounted forward of the processing unit and pivotally connected to it for removing the crop from the field and delivering it to the processing unit;

engine means drivingly connected to the processing unit and mounted on the frame behind the processing unit substantially within said tunnel;

unloading means including a transverse conveyor within said transverse conveyor housing for transferring grain from the first saddle tank portion to the second, an upright conveyor within the second saddle tank portion, and a discharge conveyor swingably mounted on the upright conveyor; and an operator's station mounted on the frame forward of the grain tank, above the crop processing unit and offset from the fore-and-aft center line of the harvester.

39. The invention defined in claim 38 wherein the harvester further includes a housing means mounted rearward of the grain tank and above the engine means, said housing means extending substantially the width of the grain tank and having walls including screened openings;

cooling means associated with the engine;

passage means between said housing means and the cooling means; and a fan means operatively associated with said passage means for moving air sequentially through the openings and the cooling means.

40. A self-propelled combine comprising:

a mobile main frame having first and second opposite upright frame sides, each side including a lower generally fore-and-aft frame element having a forward portion, a rear portion, transverse pivot means connecting the front and rear portions, an upper generally fore-and-aft frame element above the lower element, a front generally upright frame element interconnecting the upper and lower fore-and-aft frame elements adjacent the forward ends, a rear generally upright frame element interconnecting the upper and lower frame element adjacent their rearward ends, a first diagonal member connected to the upper frame element adjacent to said forward end and connected to the lower frame element adjacent said transverse pivot means, and a second diagonal member connected to the upper frame element adjacent to said rearward end and connected to the lower frame element adjacent to said transverse pivot means, said main frame also including a plurality of lateral members interconnecting the frame sides and including a front axle structure interconnecting the lower frame elements adjacent their forward ends, a tubular conveyor housing rigidly interconnecting the lower frame elements adjacent said transverse pivot means, and a rear axle assembly including a rear axle support interconnecting the lower frame elements adjacent their rearward ends, a fore-and-aft pivot means mounted on the rear axle support, and a rear axle structure mounted on the fore-and-aft pivot means for oscillation thereon;

a crop handling means mounted on the frame and including a grain tank mounted on the frame and having an elevated central portion and a pair of saddle portions depending from the opposite sides of the central portion in communication with the conveyor housing and having downward converging front and rear walls converging toward and connected to the conveyor housing, the front and rear walls at least partially forming the first and second diagonal frame elements respectively of the opposite frame sides;

a generally fore-and-aft crop processing means mounted on the frame above the front axle structure and below the central portion of the grain tank between the saddle portions and operative to deliver processed crop material to the crop handling means;

an operator's station mounted on the frame above the front axle structure and forwardly of the grain tank;

an engine mounted on the frame rearwardly of the transverse pivot means; and wheel means mounted on the front and rear axle structures.

41. The invention defined in claim 51 and including removable pin means operatively connecting the rearward portions of the lower fore-and-aft frame elements to the rear upright elements, the transverse pivot means also being removable whereby the rear portion of the lower frame elements, the rear axle support and the rear axle structure carried thereby, and the engine are easily separable from the remainder of the combine.

42. A self-propelled crop harvester comprising:

a supporting structure having two opposite upright truss frame sides, each of which includes a plurality of members connected together at their extremities so as to form three contiguous triangular bays, each frame side having a forward lower member, a rearward lower member and generally upright front and rear members in the form of struts, each of which is pivotally connected at its ends to adjoining members of the truss frame side, the supporting structure also including a transverse conveyor housing extending between the lower members of the frame sides and connected rigidly adjacent the rearward ends of the opposite forward lower members of said sides, the supporting structure also having a forward transverse subframe, including the opposite forward lower members of the frame sides, the transverse conveyor housing and a forward transverse member, said transverse member having brackets and drive housings and forming a front axle assembly and extending between the forward ends of the lower forward members of the frame sides, the supporting structure also having a rearward transverse subframe including the opposite rearward lower members of the frame sides, said members being pivotally connected at their forward ends to the rearward ends of the opposite forward lower members of the frame sides, the rearward transverse subframe also having a rear transverse member, said member having a downward extending bracket;

a rear axle assembly pivotally connected to the downward extending bracket of the rear transverse member;

a grain tank provided for temporary storage of the processed crop, and having an elevated central portion and first and second depending saddle portions communicating with it, the saddle portions straddling the harvester and having inner and outer walls and downwardly converging front and rear walls, said inner and outer walls having generally triangular lower sections, said saddle tank portions being attached rigidly adjacent their lower extremities to the transverse conveyor housing and said inner walls coinciding with corresponding bays of the opposite truss frame sides and being connected to adjoining members of the frame sides as to constitute an essential structural part of the frame sides, said grain tank, frame sides and subframes defining a longitudinally extending tunnel-like space;

an engine for propelling the harvester, carried by the rear transverse subframe towards the rear of the tunnel-like space;

a crop processing unit carried by the supporting structure forward of the engine, towards the front of the tunnel-like space, the processing unit having structural integrity and being connected to the forward transverse subframe, and frame sides so as to reinforce said supporting structure;

harvesting means mounted forwardly on the supporting structure for removing the crop from the field and delivering it to the processing unit;

unloading means carried by the supporting structure and including a transverse conveyor within said transverse conveyor housing, a vertical conveyor and a discharge conveyor, the transverse conveyor being operable to transfer processed crop from the first saddle tank portion to the second and deliver it to the vertical conveyor, said vertical conveyor extending upward in the second saddle tank portion and being operable to transfer the processed crop to the discharge conveyor, the discharge conveyor being swingably mounted at the upper end of the vertical conveyor and operable to discharge processed crop from the harvester; and an operator's station carried by the supporting structure forward of the grain tank and above the front axle assembly.

43. The invention defined in claim 42 wherein the crop processing unit, the rearward transverse subframe with the engine and rear axle assembly, the grain tank with the unloading means, and the operator's station are each generally selfcontained units adapted to be assembled to and disassembled from the harvester as units.

44. The invention defined in claim 43 wherein the selfpropelled crop harvester also includes a screened engine cooling air intake housing, said housing enclosing at least one component ancillary to the engine, said housing being adapted to be assembled to and removed from the harvester as a unit.

45. A self-propelled combine having a main frame including opposite upright fore-and-aft extending frame sides, a crop processing means mounted on the main frame, a crop handling means carried by the frame and adapted to receive crop material from the processing means and including a grain tank disposed generally above the crop processing means and constituting a structurally integral upper portion of the main frame, said grain tank extending transversely between the opposite frame sides and cooperating with them to define a tunnel for housing the crop processing means, characterized in that the grain tank has an elevated central portion and a pair of connecting saddle portions depending from the opposite sides of the central portion and disposed on opposite sides of the crop processing means, the saddle portions constituting a structurally integral part of the opposite frame sides and extending substantially to the bottom of said sides.

46. The invention defined in claim 45 wherein the opposite frame sides are in the form of trusses including at least two triangular bays, said bays being defined by frame members including upper and lower fore-and-aft members, and diagonal members interconnecting the upper and lower members and each saddle portion of the grain tank includes downwardly converging front and rear walls, one of said walls at least partially constituting a diagonal member of the truss of the opposite frame sides.

47. The invention defined in claim 46, and further including a transverse auger-type conveyor interconnecting the bottoms of saddle portions of the grain tank below the crop processing means and including a tubular housing and wherein each truss frame side includes a first lower joint in which at least one diagonal and one fore-and-aft member of the truss meet and in which the tubular housing of the conveyor is rigidly connected.

48. The invention defined in claim 47 wherein the opposite truss frame sides each include rear lower fore-and-aft extending members reasonably connected at their forward ends to ajacent said first lower joint of the truss, a rear axle structure extending between the rearward ends of said lower members and cooperating with them to form a rear subframe and the combine further includes an engine for driving the combine mounted on the subframe, the subframe with engine being separable from the combine as a module.

49. The invention defined in claim 45 further including a transverse auger-type conveyor, interconnecting the bottoms of the saddle portions below the crop processing means and including a tubular housing rigidly connected to the opposite frame sides.

* * * * *

UNITED STATES PATENT OFFICE
CERTIFICATE OF CORRECTION

Patent No. 4,060,960          Dated  6 December 1977

Inventor(s) Edward John Hengen and Mahlon Lloyd Love

It is certified that error appears in the above-identified patent and that said Letters Patent are hereby corrected as shown below:

Column 9, line 63, delete "extends" and insert --includes--.

Column 14, line 6, delete "connection" and insert --connections--; line 36, delete "and" and insert --an--.

Column 16, line 37, delete "51" and insert --40--.

Signed and Sealed this

Sixteenth Day of May 1978

[SEAL]

Attest:

RUTH C. MASON
Attesting Officer

LUTRELLE F. PARKER
Acting Commissioner of Patents and Trademarks